US009676399B1

(12) United States Patent
Simko (10) Patent No.: US 9,676,399 B1
(45) Date of Patent: Jun. 13, 2017

(54) SWIVEL DECK SYSTEM FOR FLATCAR LOADING AND UNLOADING

(71) Applicant: James Frederick Simko, Fairbanks, AK (US)

(72) Inventor: James Frederick Simko, Fairbanks, AK (US)

(*) Notice: Subject to any disclaimer, the term of this patent is extended or adjusted under 35 U.S.C. 154(b) by 0 days.

(21) Appl. No.: 14/824,909

(22) Filed: Aug. 12, 2015

Related U.S. Application Data (63) Continuation-in-part of application No. 13/987,803, filed on Sep. 3, 2013, now abandoned.

(51) Int. Cl.
*B65G 67/04* (2006.01)
*B61D 47/00* (2006.01)

(52) U.S. Cl.
CPC ........... *B61D 47/005* (2013.01); *B65G 67/04* (2013.01)

(58) Field of Classification Search
CPC ...... B61D 47/005; B61D 47/00; B61D 3/184; B62D 53/0087; B65G 67/04
USPC .......................................................... 414/339
See application file for complete search history.

(56) References Cited

U.S. PATENT DOCUMENTS

| | | | | |
|---|---|---|---|---|
| 1,271,812 A | * | 7/1918 | Wagner | B61D 47/005 104/44 |
| 2,782,733 A | * | 2/1957 | Ewing | B61D 3/184 105/159 |
| 2,994,159 A | * | 8/1961 | Bonidie | A63H 19/15 104/296 |
| 3,352,438 A | * | 11/1967 | Davidson | B60P 1/6427 410/1 |
| 3,490,389 A | * | 1/1970 | Brown | B61D 3/04 104/35 |
| 3,548,756 A | * | 12/1970 | Fujioka | B61D 47/00 105/455 |
| 3,561,625 A | * | 2/1971 | Dioguardi | B60P 1/52 104/43 |
| 3,576,167 A | * | 4/1971 | Macomber | B61D 45/005 105/159 |
| 3,916,799 A | * | 11/1975 | Smith | B60P 1/64 410/1 |
| 4,075,951 A | * | 2/1978 | Chierici | B61F 5/16 105/199.4 |
| 4,129,079 A | * | 12/1978 | Shannon | B61D 47/005 410/1 |
| 4,776,735 A | * | 10/1988 | Walda | B61D 47/005 104/37 |

(Continued)

*Primary Examiner* — Kaitlin Joerger
(74) *Attorney, Agent, or Firm* — Michael J. Tavell (57) ABSTRACT

A swivel deck loading and off loading system for flatcars. The system is mounted onto a flatbed railcar and works in conjunction with the railroad loading/off loading area for the safe and efficient loading/off loading of transported equipment, such as trailers, from either side of the rail car. The system uses a structured ramp platform, which is affixed to the top flange of a slew ring bearing. The slew ring bearing lower flange is affixed to a mounting plate. This mounting plate is affixed to the bed of the rail car. The ramp platform swivels freely and is supported on a polyethylene sheet, which is affixed to the bed of the rail car. This arrangement operates such that it allows the platform to freely rotate without binding when under load. A forklift is used to lift the front of trailers so that the trailers can be loaded/unloaded from the flatcar.

18 Claims, 12 Drawing Sheets

(56) References Cited

U.S. PATENT DOCUMENTS

| | | | | |
|---|---|---|---|---|
| 4,946,324 A * | 8/1990 | Tse | ............... | B61D 47/005 |
| | | | | 410/1 |
| 4,948,310 A * | 8/1990 | Ord | ............... | B61D 47/005 |
| | | | | 410/1 |
| 5,011,362 A * | 4/1991 | Pijanowski | ............ | B60P 3/07 |
| | | | | 16/362 |
| 5,263,807 A * | 11/1993 | Pijanowski | ............ | B60P 3/07 |
| | | | | 16/362 |
| 5,281,072 A * | 1/1994 | Patouillard | ......... | B61D 45/007 |
| | | | | 105/355 |
| 6,352,400 B1 * | 3/2002 | Forbes | ............ | B65G 69/30 |
| | | | | 14/72.5 |
| 6,439,594 B1 * | 8/2002 | Johansson | ............ | B60P 3/073 |
| | | | | 280/425.1 |
| 6,695,561 B2 * | 2/2004 | Barry | ............ | B65G 63/025 |
| | | | | 414/333 |
| 6,792,874 B1 * | 9/2004 | Anderson | ............ | B61F 5/16 |
| | | | | 105/199.4 |
| 6,968,788 B1 * | 11/2005 | Coslovi | ............ | B61D 3/184 |
| | | | | 105/355 |
| 7,229,058 B2 * | 6/2007 | Lyrstrand | ............ | B62D 53/0857 |
| | | | | 248/503 |
| 8,267,626 B2 * | 9/2012 | Claas | ............ | B61D 47/005 |
| | | | | 410/1 |
| 8,667,902 B2 * | 3/2014 | Linde | ............ | B61D 47/005 |
| | | | | 105/355 |
| 9,248,984 B2 * | 2/2016 | Andre | ............ | B61D 3/184 |
| 2013/0078078 A1 * | 3/2013 | Andre | ............ | B61D 3/184 |
| | | | | 414/809 |

* cited by examiner

SWIVEL DECK SYSTEM FOR FLATCAR LOADING AND UNLOADING

CROSS REFERENCE TO RELATED APPLICATIONS

This application is a continuation-in-part of application Ser. No. 13/907,803, filed Sep. 3, 2013, now copending.

STATEMENT REGARDING FEDERALLY SPONSORED RESEARCH AND DEVELOPMENT

Not Applicable

BACKGROUND OF THE INVENTION

1. Field of the Invention

This invention relates to swivel deck systems for flatcar loading and unloading and particularly to swivel deck systems for flatcar loading and unloading road trailers using forklifts with the swivel deck.

2. Description of the Prior Art

Currently all road trailers that are carried on railroad flat cars are configured as either TOFC (trailer on flat car) or COFC (container on flat car). The TOFC configuration uses approximately 30 feet of railcar deck to hold the rear section of the trailer wheel set in a wheel track guide. The wheel track guide keeps the trailer wheel set centered. The front of the trailer is carried only by a king plate assembly mounted on the rail car deck, into which the kingpin of the trailer is secured. This transportation system can carry trailers from 20 feet to 53 feet in length.

The current loading/off loading process calls for the road trailers to be staged near the rail line. This is done using a LETOURNEAU top-lifting system or a MI-JACK Translift gantry crane to lift the load on and off the TOFC or flatcar. This process is laborious, dangerous, and time consuming. At best, the system takes an average of 3 minutes to load/off load a 50,000-pound load per trailer. Additionally, the current equipment in use requires higher than average maintenance.

BRIEF DESCRIPTION OF THE INVENTION

The instant invention overcomes these difficulties. The instant invention is has flatcar components that include: formed steel wheel guide decking, a slew ring bearing (excavator type), a self-lubricating ultra high molecular weight polyethylene sheet ("UHMWPE"), and an anti-rotation locking system. The slew ring is mounted between the top swivel deck and a lower base plate, which is centered under the trailer wheel set. The base plate is connected to the rail car deck through the UHMWPE sheet. Trailer wheel guides firmly secure the rear of the trailer to the flatcar portion of the system. The UHMWPE sheet has a surface of approximately 9.5 feet wide×30 feet long. In conjunction with a non-powered or powered slew ring, the sheet provides a sufficient bearing surface that allows for easy and non-binding swiveling of the swivel deck system. The weight is spread over the sheet such that the load is kept to less than 100 lbs per sq ft.

An adjustment in the forward king pin plate position and a modified wheel guide deck allow the trailer wheel set to be positioned optimally near the slew ring (to achieve the best rotation). This system accommodates trailers from 20 to 53 feet in length and up to 50,000 lbs.

With additional minor modifications, the invention can be used for easy drive on/off loading of any and all wheeled, tracked, or crawler tread equipment, and vehicles, etc.

DETAILED DESCRIPTION OF THE INVENTION

Figure 1:
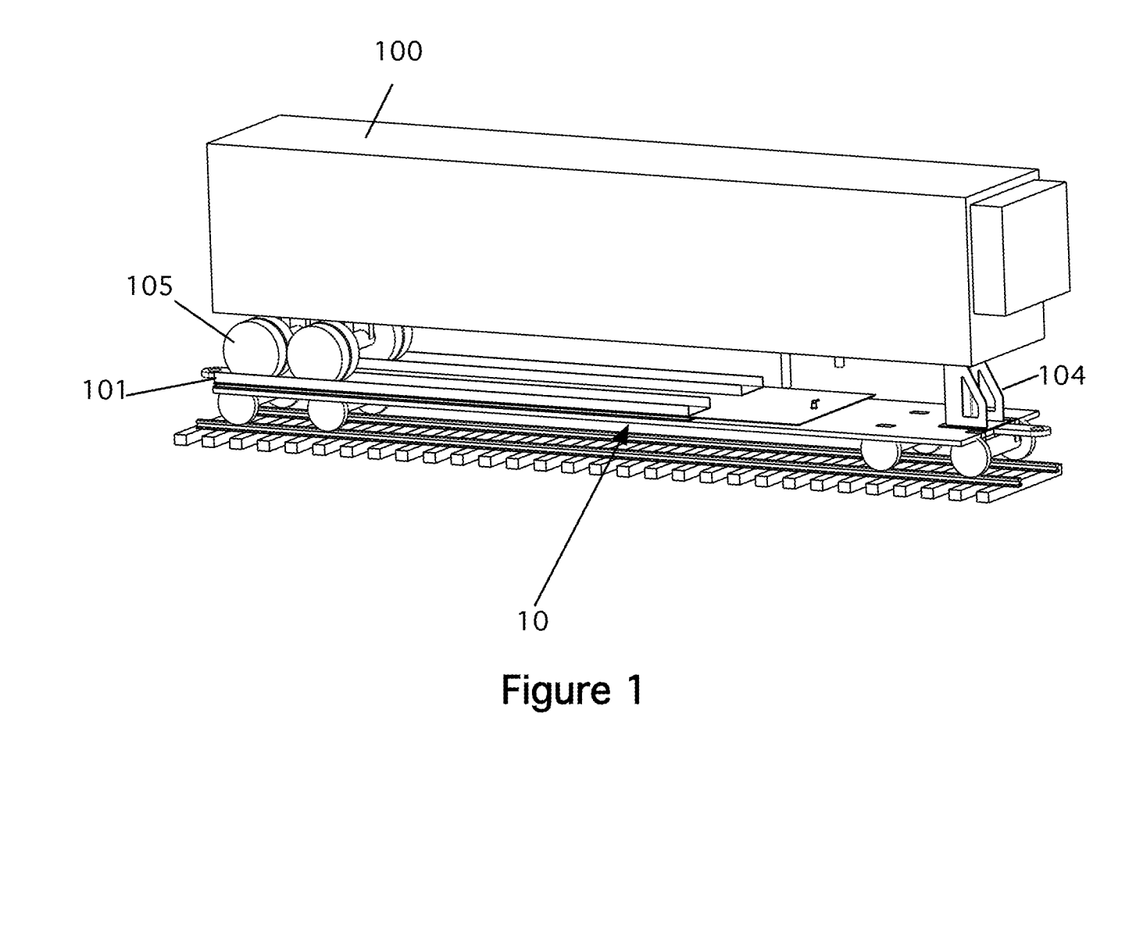
FIG. 1 is a side perspective view of flat bed rail car section with the swivel deck system installed and a road trailer in place.

Referring now to FIG. 1, a side perspective view of flat bed rail car section with the swivel deck system installed and a road trailer in place is shown. In this view, a road trailer 100 is positioned on a flatcar 101. The trailer 100 has standard landing gear 102 and a king pin (not shown), which is secured in the king pin plate 103 (see, e.g., FIGS. 2 and 3) as is not visible. The king pin plate 103 is held in place by the king pin support 104. Note that the rear wheels 105 of the road trailer 100 are positioned on the swivel deck system 10.

Figure 2:
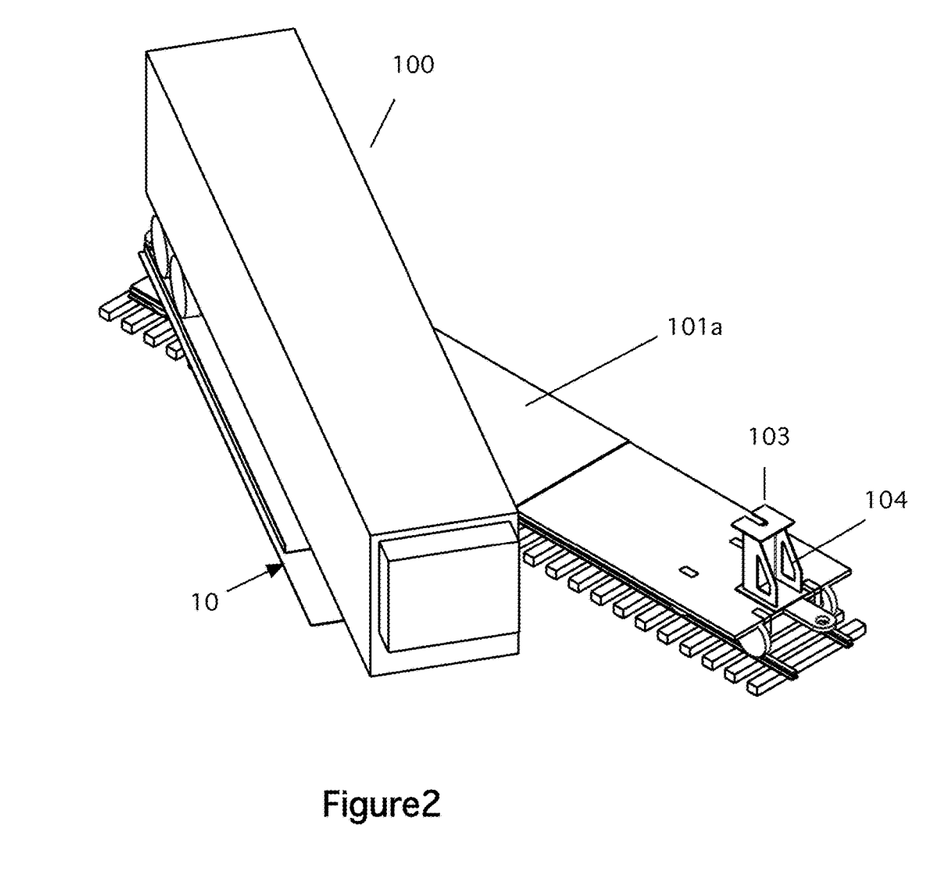
FIG. 2 is top perspective view of a flat bed rail car section with road trailer installed on the swivel deck system shown in the off loading position (the fork lift is not shown for clarity).

FIG. 2 is top perspective view of a flat bed rail car section with road trailer 100 installed on the swivel deck system 10 shown in the off loading position (a fork lift is not shown for clarity). Note that under the swivel system is the flatcar deck 101a. Here, the road trailer has been turned using the swivel deck system so that it can be connected to a truck for removal. As discussed below, this is done by releasing the kin pin from the king pin plate 103 and then lifting the trailer and, using the fork lift, rotating the trailer on the swivel deck system to the position shown in FIG. 2.

Figure 3:
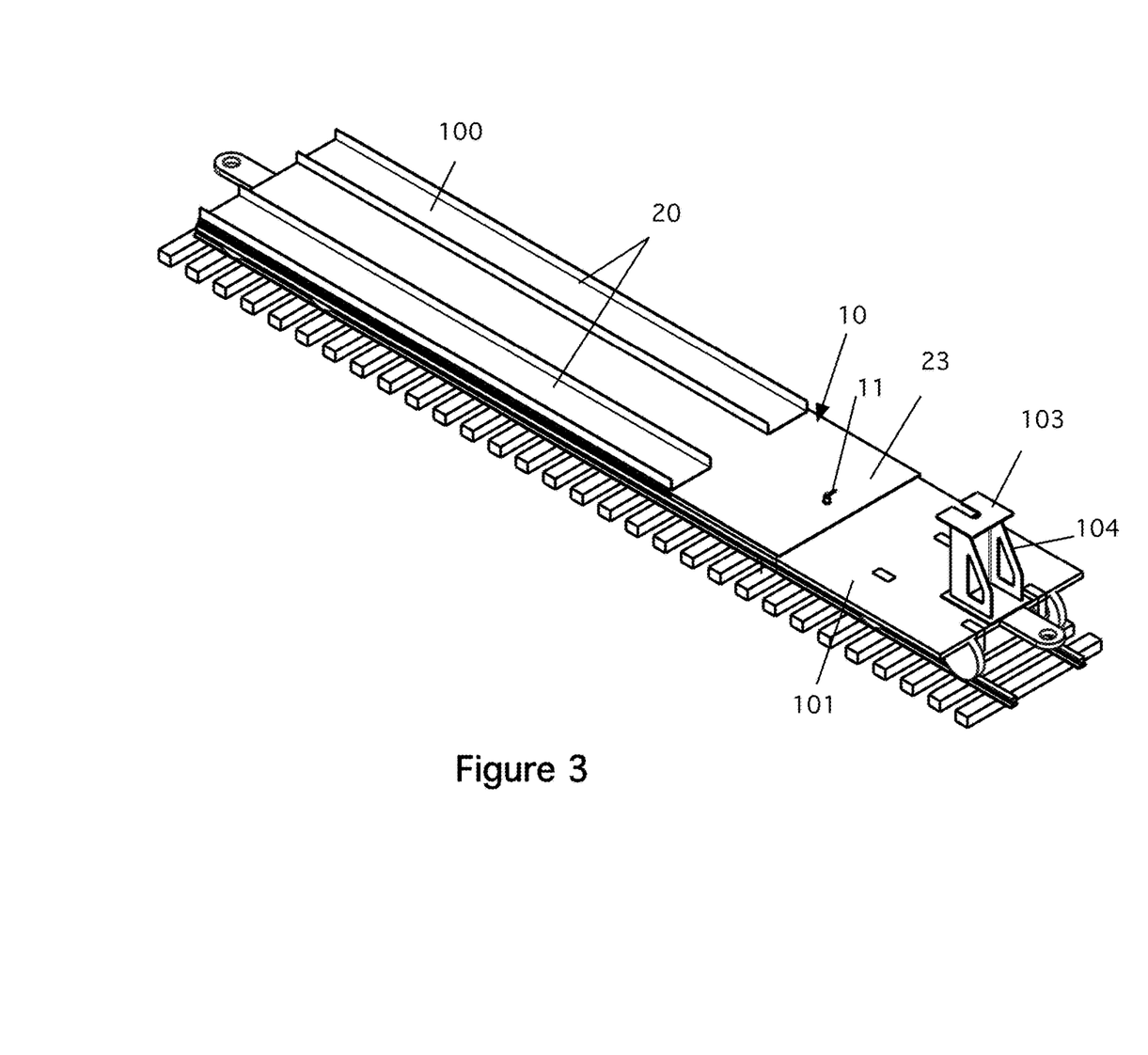
FIG. 3 is a top perspective view of a single flat bed rail car section and swivel deck system in place.

FIG. 3 is a top perspective view of a single flat bed rail car 101 section and swivel deck system 10 in place. The swivel system 10 is placed on a portion of the rail car 101. The forward portion of the car that has the king pin plate 103 and the kin pin support 104 is fixed to the car and does not rotate.

Note that the car includes an anti rotation device (pin) 11 that ensures that the swivel system does not move while the car is in transit. Note that the two wheel guides 20 form the uppermost part of the swivel deck system. See also FIG. 7.

Figure 4:
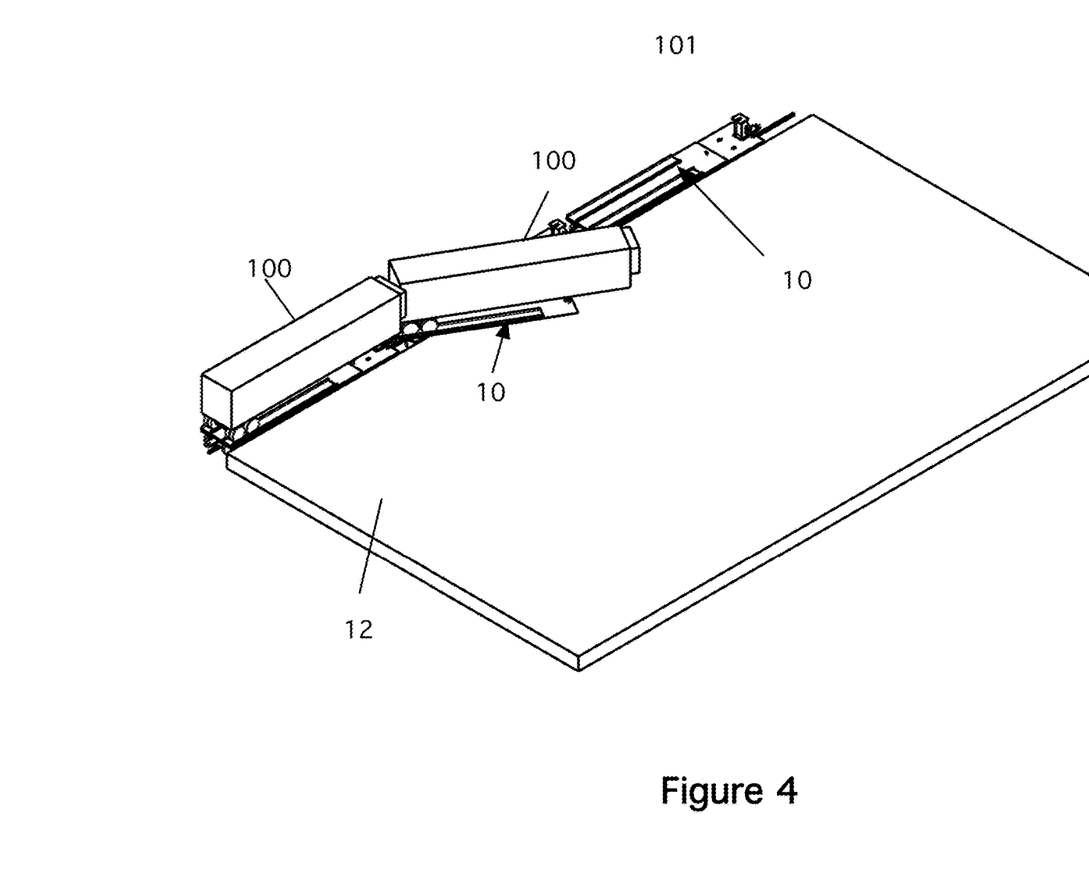
FIG. 4 is a is a top rear perspective view flat bed rail car sections with two road trailers installed and swivel deck systems in place showing the forward road trailer in off loading position.

FIG. 4 is a is a top rear perspective view flat bed rail car sections with two road trailers installed and swivel deck systems in place showing the forward road trailer in off loading position. Here, a raised loading platform 12 is shown adjacent to a section of track. In this view, one of the trailers is shown rotated off the flat car using the swivel system 10. As discussed below, this is done using a heavy-duty forklift and a special tool called a grabber. Once the trailer it sufficiently rotated, a truck can drive up the ramp 12 and connect to the trailer so that it can be removed directly from the swivel system. As discussed below, in a similar way, trailers can be loaded onto the flat cars.

Figure 5:
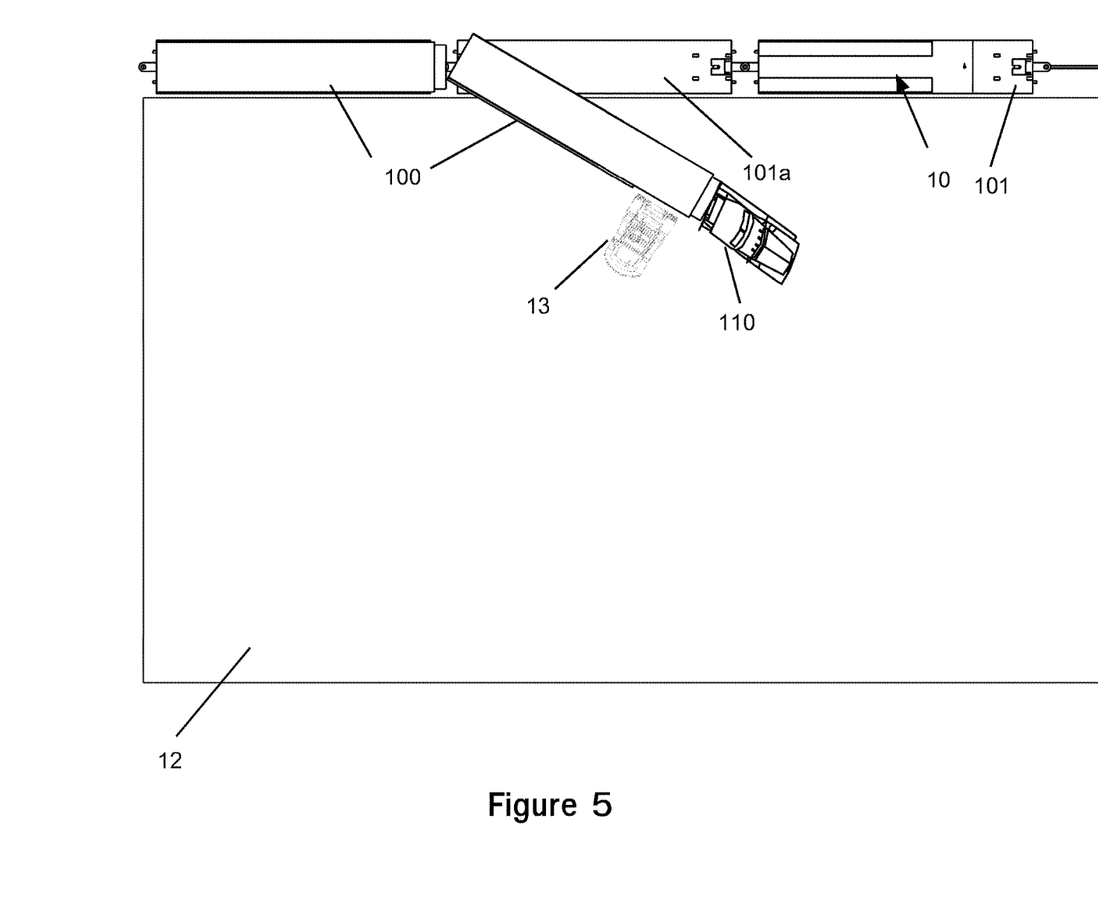
FIG. 5 is a top rear perspective view of the flat bed rail car sections of FIG. 4 showing the forward road trailer in the offloading position and a forklift moving the trailer.
Figure 6:
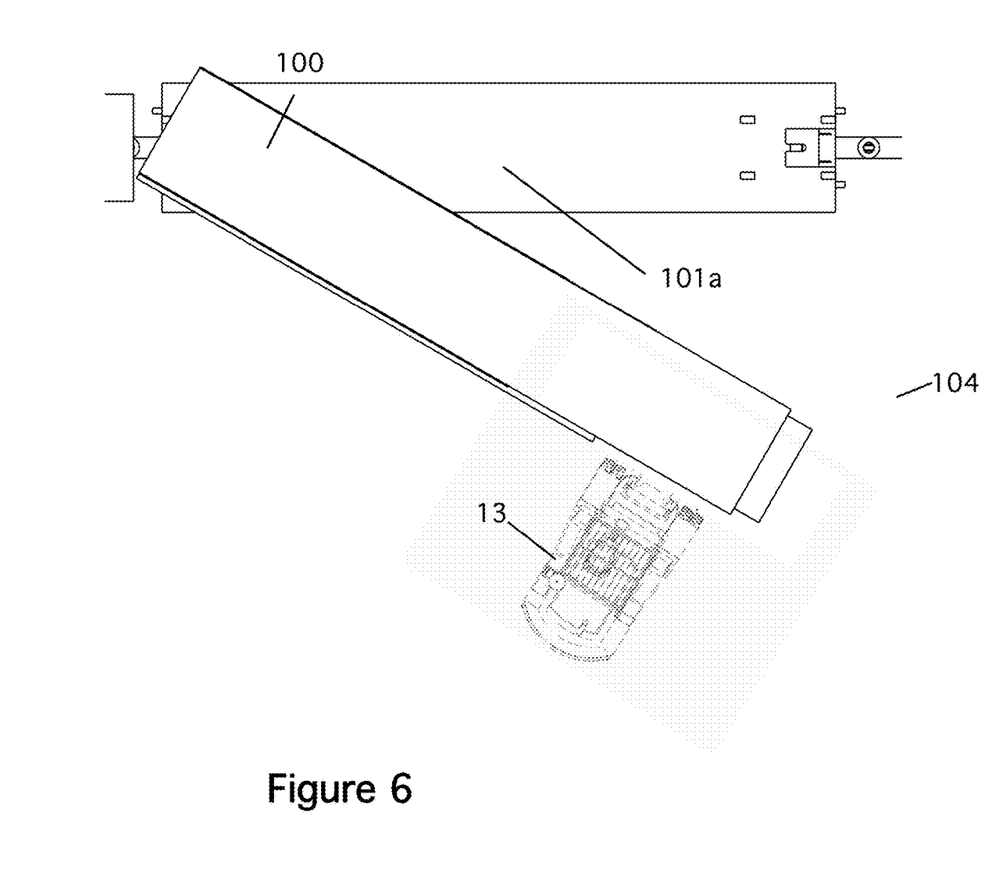
FIG. 6 is an enlarged detail view of the trailer, the flat car and the forklift of FIG. 5.

FIG. 5 is a top rear perspective view of the flat bed rail car sections of FIG. 4 showing the forward road trailer in the offloading position and a forklift 13 moving the trailer. In this view, the forklift 13 is shown attached to the trailer. Once attached, as discussed below, the forklift 13 lifts the trailer to remove it from the king pin support. Once free, the trailer 100 is simply pulled back from the car (as shown by the arrow). The swivel system 10 makes this operation simple. When the trailer 100 is in the position shown, a truck 110 can back up and attach to the trailer so it can be removed from the car (or in reverse, so that the truck 110 can place the trailer 10 on the swivel system for loading). FIG. 6 is an enlarged detail view of the trailer 100, the flat car 101 and the forklift 13 of FIG. 5.

Figure 7:
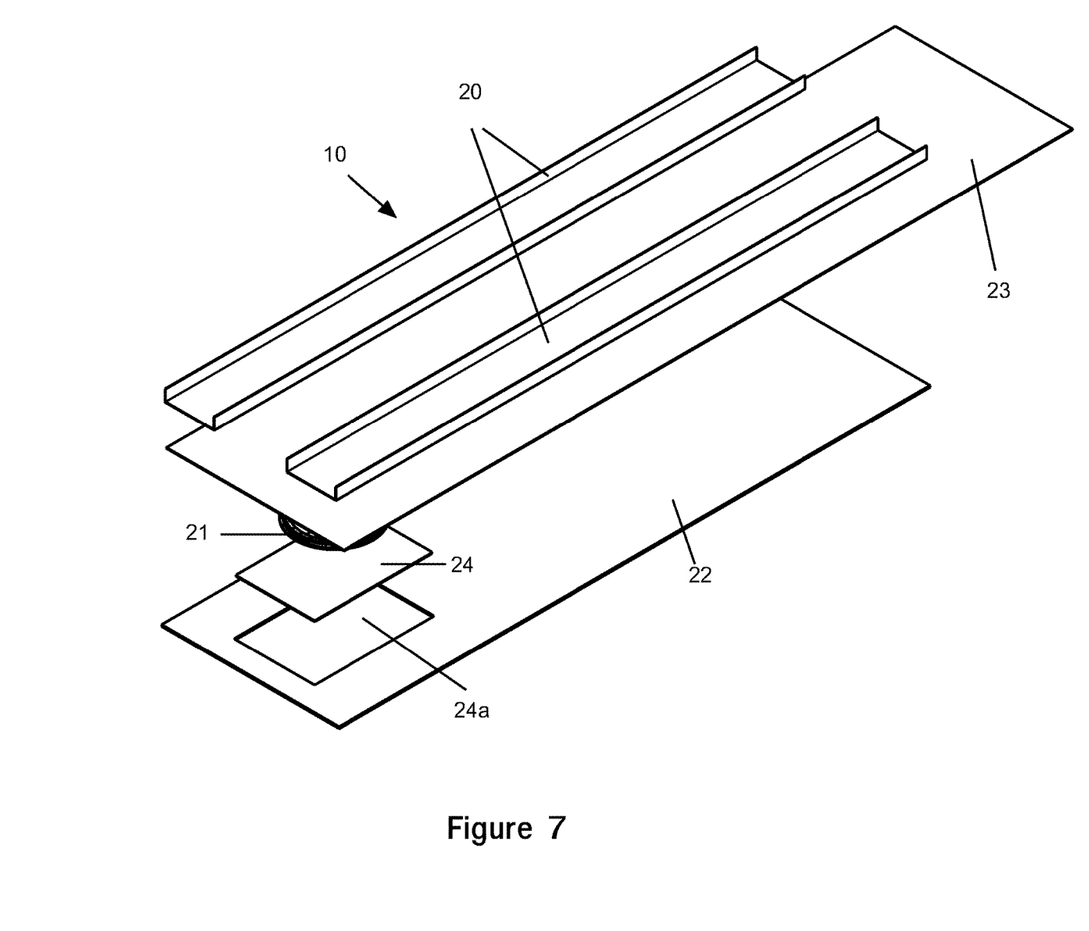
FIG. 7 is an exploded view of a swivel deck system components.

FIG. 7 is an exploded view of a swivel deck 10 system components. These include a pair of formed steel wheel guide decks 20, a slew ring bearing 21 (excavator type), and a self-lubricating ultra high molecular weight polyethylene sheet 22 ("UHMWPE"). The slew ring 21 is mounted between a top swivel deck 23 and a lower base plate 24, which is centered under the trailer wheel set. The base plate 24 is connected to the rail car deck through a hole 24a formed in the UHMWPE sheet. The trailer wheel guides 20 firmly secure the rear of the trailer 100 to the flatcar portion of the system.

The UHMWPE sheet 22 has a surface of approximately 9.5 feet wide×30 feet long in the preferred embodiment. In conjunction with a non-powered or powered slew ring 21, the sheet provides a sufficient bearing surface that allows for easy and non-binding swiveling of the swivel deck system. The weight is spread over the sheet such that the load is kept to less than 100 lbs per sq ft.

Figure 8:
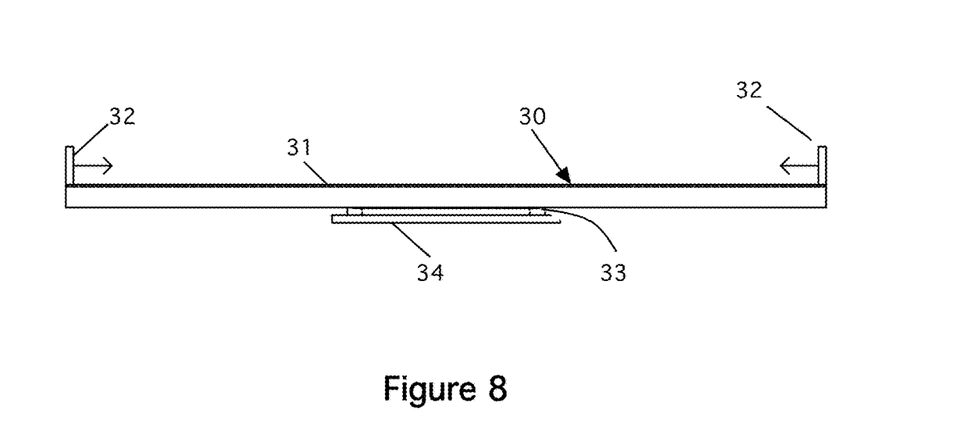
FIG. 8 is a front view of a forklift trailer grabber.
Figure 9:
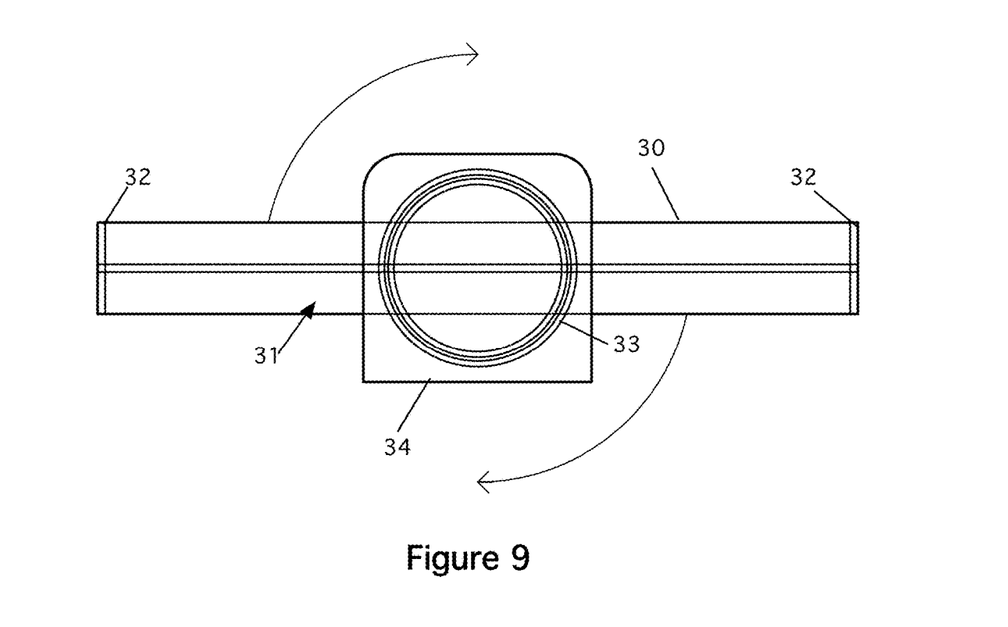
FIG. 9 is a top view of the grabber.
Figure 10:
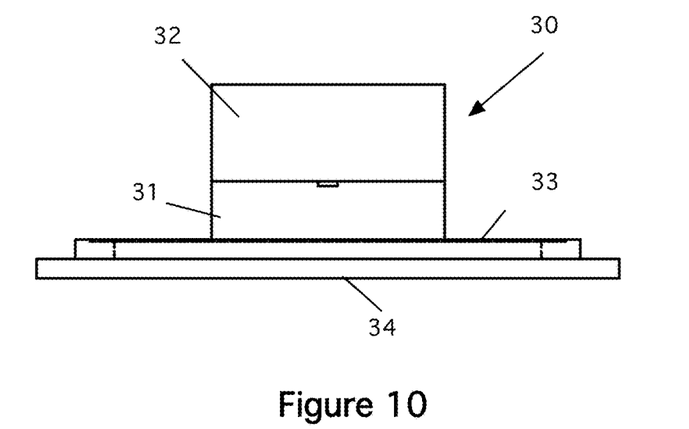
FIG. 10 is a side view of the grabber.
Figure 11:
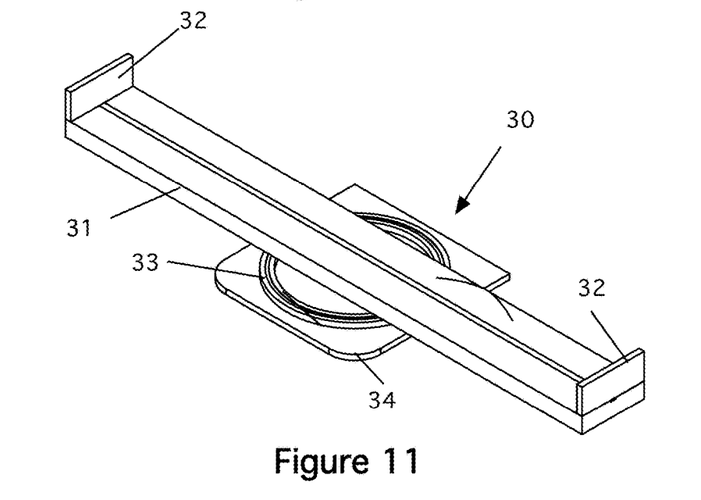
FIG. 11 is a top perspective view of the grabber.

FIG. 8 is a front view of a forklift trailer grabber. FIG. 9 is a top view of the grabber. FIG. 10 is a side view of the grabber. FIG. 11 is a top perspective view of the grabber. In the preferred embodiment, a 25 ton industrial capacity forklift truck (or equivalent) is outfitted with a special "attaching" fork system, or grabber, which grip the bottom of the front of the trailer, between the landing gear 102 and the king pin plate 103 (a space of approx. 4 ft). As shown in FIG. 8, the grabber has a lifting beam 31 that has two inward moving gripper plates 32. These plates are slid inward to grip the trailer bottom, as explained below. Below the lift beam 31 is a slew ring 33, and a quick attach receiving hitch 34 for the forks. The slew ring is used to rotate the grabber as needed. For example, to insert the grabber between the landing gear and king plate, it must be power rotated so the grabber is almost parallel to the forklift forks. After the grabber plates are holding the trailer firmly, the grabber can be free wheeled or released so it rotates as required by the movement of the forklift.

Figure 12:
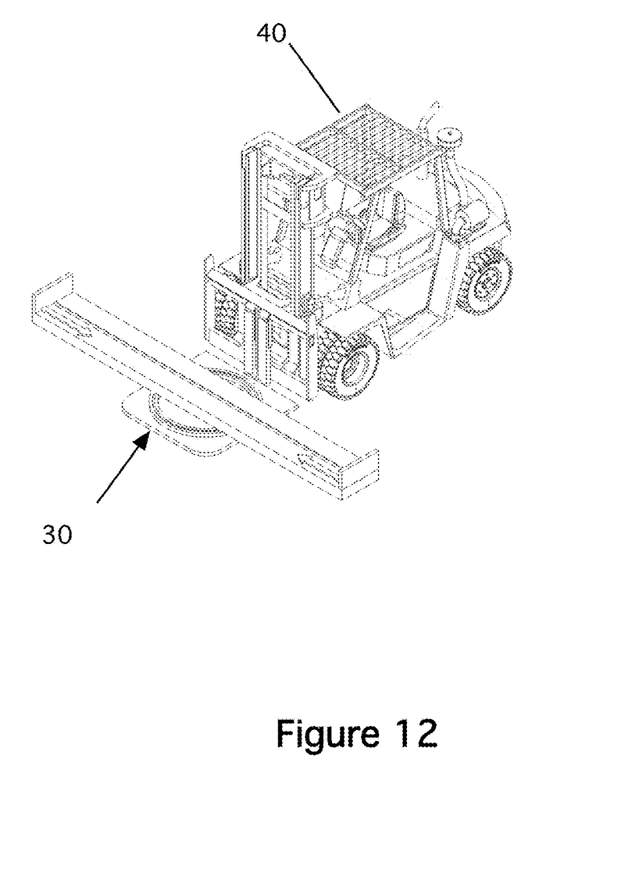
FIG. 12 is a top perspective view of a forklift with the grabber installed.
Figure 13:
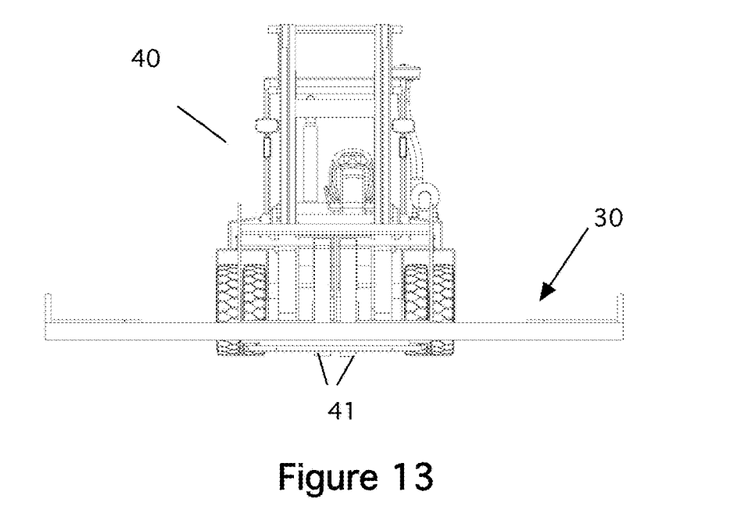
FIG. 13 is a front view of a forklift with the grabber installed.
Figure 14:
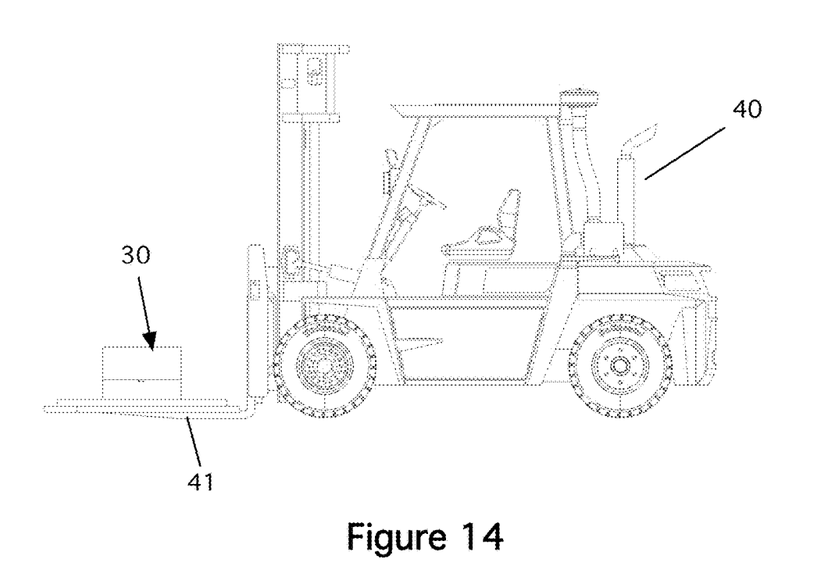
FIG. 14 is a right side view of a forklift with the grabber installed.
Figure 15:
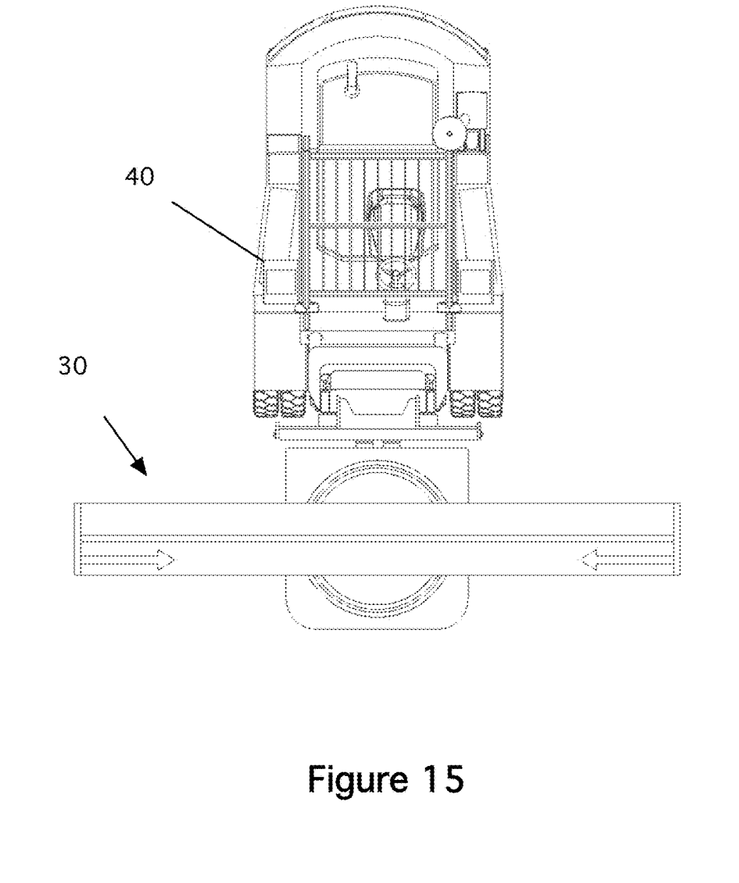
FIG. 15 is a top view of a forklift with the grabber installed.

FIG. 12 is a top perspective view of a forklift 40 with the grabber 30 installed. FIG. 13 is a front view of a forklift 40 with the grabber 30 installed. FIG. 14 is a right side view of a forklift with the grabber installed. Note the placement of the forks 41 in FIGS. 13 and 14. FIG. 15 is a top view of a forklift 40 with the grabber 30 installed.

Operation Overview

Off Loading:

With a train pulled into the raised loading area, a rail yard operator unlocks the anti-rotation device 11 (industry standard design and access). The rear of the trailer remains secured by the swivel deck, slew ring and wheel guides. The front of the trailer remains secured by the king pin plate.

As discussed above, an industrial capacity forklift 40 truck (or equivalent) is outfitted with the gripper 30, which is used to grip the bottom of the front of the trailer, between the landing gear and the king pin plate.

This 25-ton capacity forklift 40 (or equivalent) lifts the front of the trailer off the king pin plate, raising it approx. 2"-3", and then the forklift 40 backs up slowly for approx. 10-15 ft. See, e.g., FIG. 5. This movement by the forklift causes the swivel deck system to rotate the front end of the trailer fully over the polished concrete of the raised loading area (see, FIG. 2), where the landing gear of the trailer can then be deposited onto the loading area surface. With the leading edge of the swivel deck system now resting securely and completely on the raised loading area (which is raised to railcar deck height), the trailer is ready to be completely off loaded by a road tractor 105 (as shown in FIG. 5).

Loading:

Loading is accomplished by reversing the procedure as described above under "off loading". In this case, the forklift 40 raised the front of the trailer and the swivel deck system is rotated back until the trailer is on board the railcar deck, the trailer is then lowered and locked into position on the king plate and the wheel guides. The anti-rotation device 11 is then secured.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A swivel deck system, installed on a flatcar, having a deck, for flatcar loading and unloading of highway trailers having a front, a bottom, a king pin and a set of landing gear wheels, comprising:
   a) a self-lubricating sheet having a hole formed therein;
   b) a base plate, connected to said flatcar deck through the hole formed in said self-lubricating sheet;
   c) a slew ring bearing, attached to said base plate;
   d) a pair of wheel guides, mounted to the self-lubricating sheet;
   e) a forklift; and
   f) a forklift trailer grabber, installed on said forklift, such that said forklift trailer grabber is positioned beneath a highway trailer when loading or unloading a highway trailer from said swivel deck system, said forklift trailer grabber having two movable gripper plates, positioned to grip the bottom of the front of the trailer between the landing gear and the king pin.

2. The swivel deck system of claim 1 further comprising an anti rotation device removably secured to said flatcar through said self-lubricating sheet, such that when said anti rotation device is installed, said self-lubricating sheet is prevented from swiveling with respect to said flatcar deck.

3. The swivel deck system of claim 1 wherein the self-lubricating sheet is an ultra high molecular weight polyethylene sheet.

4. The swivel deck system of claim 1 wherein the forklift is a 25-ton industrial capacity forklift truck.

5. The swivel deck system of claim 1 wherein the forklift trailer grabber further includes:
   a) a quick attach receiving hitch for attaching the forklift trailer grabber to said forklift;
   b) a slew ring bearing, attached to said quick attach receiving hitch; and
   c) a lift beam, attached to said slew ring bearing.

6. A method of offloading a trailer from a flat car having a swivel deck system comprising the steps of:
   a) having a train pull into a raised loading area so that at least one flatcar having a swivel deck system and a king pin plate installed on said flatcar, and also having a trailer, having a front, an undercarriage, a king pin, a set of landing gear wheels, and a plurality of road wheels, positioned on said swivel deck system, such that the plurality of road wheels of said trailer are positioned on said swivel deck system and the front of said trailer is secured by the king pin plate, is aligned with said raised loading area;
   b) unlocking an anti-rotation device installed on said the swivel deck system, thereby enabling said swivel deck system to rotate with respect to said flatcar;
   c) positioning a forklift, having a gripper thereon, adjacent to said flatcar on said raised loading area such that the gripper is aligned with the front of said trailer and is positioned between the king pin and said landing gear wheels;
   d) applying the gripper to the undercarriage of said trailer;
   e) lifting the front of the trailer off the king pin plate; and
   f) rotating the trailer using the swivel deck system until the trailer is positioned over said railed loading area such that the trailer can be set down on the landing gear wheels for further transport.

7. The method of claim 6 further comprising the steps of:
   a) prior to step a of claim 6, forming a swivel deck system by combining:
      i) a self-lubricating sheet having a hole formed therein;
      ii) a base plate, connected to said flatcar deck through the hole formed in said self-lubricating sheet;
      iii) a slew ring bearing, attached to said base plate; and
      iv) a pair of wheel guides, mounted to the self-lubricating sheet.

8. The method of claim 7 wherein the step of combining a self-lubricating sheet further includes the step of choosing an ultra high molecular weight polyethylene sheet for the self-lubricating sheet.

9. The method of claim 6 wherein, prior to step c, the formation of said gripper comprises the steps of:
   a) attaching a quick attach receiving hitch for attaching the gripper to said forklift;
   b) installing a slew ring bearing, attached to said quick attach receiving hitch;
   c) installing a lift beam, attached to said slew ring bearing; and
   d) attaching two movable gripper plates, such that said two movable gripper plates are slidably attached to said lift beam.

10. The method of claim 6, further comprising the steps of:
    a) after step (f) of claim 6, attaching a truck to said trailer; and
    b) using said truck to pull said trailer off said swivel deck system and onto said raised loading area for delivery to a destination.

11. The method of claim 7 wherein said plurality of road wheels on said trailer is placed in said pair of wheel guides.

12. The method of claim 6 wherein prior to step c of claim 6, choosing a 25-ton industrial capacity forklift truck to perform steps c-f of claim 6.

13. A method of loading a trailer onto a flat car having a swivel deck system comprising the steps of:
    a) having a train pull into a raised loading area so that at least one flatcar having a swivel deck system and a king pin plate installed on said flatcar, is positioned adjacent to said raised loading area;
    b) having a truck deliver a trailer, having a front, an undercarriage, a king pin, a set of landing gear wheels, and a plurality of road wheels, to said raised loading area;
    c) causing the swivel deck system on said flatcar to be rotated to a loading position;
    d) driving said trailer onto said swivel deck system such that the plurality of road wheels are positioned on said swivel deck system;
    e) lowering said landing gear wheels on said trailer;
    f) removing said truck from said trailer;
    g) positioning a forklift, having a gripper thereon, adjacent to said trailer on said raised loading area such that the gripper is aligned with the front of said trailer between said king pin and said set of landing gear wheels;
    h) applying the gripper to the undercarriage of said trailer;
    i) lifting the front of the trailer;
    j) rotating the trailer using the swivel deck system until the trailer is positioned over said flatcar such that the trailer is set down on said king pin plate;
    k) locking said kingpin plate; and
    l) locking an anti-rotation installed on said the swivel deck system, thereby preventing said swivel deck system to rotate with respect to said flatcar.

14. The method of claim 13 further comprising the steps of:
    a) prior to step (a) of claim 13 forming a swivel deck system by combining:
       i) a self-lubricating sheet having a hole formed therein;
       ii) a base plate, connected to said flatcar deck through the hole formed in said self-lubricating sheet sheet;
       iii) a slew ring bearing, attached to said base plate; and
       iv) a pair of wheel guides, mounted to the self-lubricating sheet.

15. The method of claim 14 wherein the step of combining a self-lubricating sheet uses an ultra high molecular weight polyethylene sheet therefor.

16. The method of claim 13 wherein, prior to step c, the formation of said gripper comprises the steps of:
    a) attaching a quick attach receiving hitch for attaching the gripper to said forklift;
    b) installing a slew ring bearing, attached to said quick attach receiving hitch;
    c) installing a lift beam, attached to said slew ring bearing; and
    d) attaching two movable gripper plates, such that said two movable gripper plates are slidably attached to said lift beam.

17. The method of claim 14 wherein said plurality of road wheels on said trailer is placed in said pair of wheel guides.

18. The method of claim 13 wherein prior to step c of claim 13, choosing a 25-ton industrial capacity forklift truck to perform steps c-f of claim 13.

\* \* \* \* \*